United States Patent
An et al.

(10) Patent No.: US 10,661,255 B2
(45) Date of Patent: May 26, 2020

(54) SHORT CHANNEL ORDERED MESOPOROUS CARBON LOADED INDIUM COBALT SULFIDE AND INDIUM NICKEL SULFIDE TERNARY COMPOSITE PHOTOCATALYST, THE PREPARATION METHOD THEREOF AND THE USE THEREOF

(71) Applicant: Guangdong University of Technology, Panyu District, Guangzhou (CN)

(72) Inventors: Taicheng An, Guangdong (CN); Jiangyao Chen, Guangdong (CN); Guiying Li, Guangdong (CN); Hongli Liu, Guangdong (CN)

(73) Assignee: GUANGDONG UNIVERSITY OF TECHNOLOGY, Guangzhou, Guangdong Province (CN)

( * ) Notice: Subject to any disclaimer, the term of this patent is extended or adjusted under 35 U.S.C. 154(b) by 38 days.

(21) Appl. No.: 16/099,554

(22) PCT Filed: May 16, 2017

(86) PCT No.: PCT/CN2017/084504
§ 371 (c)(1),
(2) Date: Nov. 7, 2018

(87) PCT Pub. No.: WO2017/219793
PCT Pub. Date: Dec. 28, 2017

(65) Prior Publication Data
US 2019/0184380 A1    Jun. 20, 2019

(30) Foreign Application Priority Data

Jun. 20, 2016 (CN) .......................... 2016 1 0451136

(51) Int. Cl.
*B01J 27/043*    (2006.01)
*B01J 20/20*    (2006.01)
(Continued)

(52) U.S. Cl.
CPC ............ *B01J 27/043* (2013.01); *B01D 53/02* (2013.01); *B01D 53/8668* (2013.01);
(Continued)

(58) Field of Classification Search
CPC .. B01J 27/043; B01J 20/0225; B01J 20/0248; B01J 20/0285; B01J 20/20;
(Continued)

(56) References Cited

U.S. PATENT DOCUMENTS

| | | | | |
|---|---|---|---|---|
| 3,773,909 A | * | 11/1973 | Pearlman et al. .... | C01B 19/007 423/508 |
| 7,122,502 B1 | * | 10/2006 | Teter ................... | B01J 20/0229 502/400 |
| 2011/0124498 A1 | | 5/2011 | Kuperman et al. | |

FOREIGN PATENT DOCUMENTS

| CN | 103553060 A | 2/2014 |
|---|---|---|
| CN | 103599749 A | 2/2014 |

(Continued)

OTHER PUBLICATIONS

Salvatore Piazza et al., "Nickel-Indium Sulphide Core-Shell Nanostructures obtained by Spray-ILGAR Deposition." Chemical Engineering Transactions, vol. 32, pp. 2239-2244. (Year: 2013).*

(Continued)

*Primary Examiner* — Patricia L. Hailey
(74) *Attorney, Agent, or Firm* — Hoffmann & Baron, LLP

(57) ABSTRACT

A short channel ordered mesoporous carbon loaded indium cobalt sulfide and indium nickel sulfide ternary composite photocatalyst, and a preparation method and application thereof. The short channel ordered mesoporous carbon (Continued)

loaded indium cobalt sulfide and indium nickel sulfide ternary composite photocatalyst is prepared by mixing pretreated short channel mesoporous carbon with cobalt salt, nickel salt, indium salt and reducing agent with a hydrothermal reaction. The short channel ordered mesoporous carbon is obtained by calcining a short channel ordered mesoporous silica and a carbon source under the protection of nitrogen, wherein the short channel ordered mesoporous silica is prepared by carrying out reactions of sol-gel-hydrothermal-calcination sequentially using a mixture of a surfactant, a hydrochloric acid solution, ammonium fluoride and tetraethyl orthosilicate. The photocatalyst has strong adsorption and visible light catalytic activity on VOCs, and can effectively adsorb and decompose the enriched VOCs in situ on the surface of the catalyst.

27 Claims, 1 Drawing Sheet

(51) Int. Cl.

| | | |
|---|---|---|
| B01J 20/02 | (2006.01) | |
| B01J 20/30 | (2006.01) | |
| B01J 35/10 | (2006.01) | |
| B01J 20/32 | (2006.01) | |
| B01D 53/02 | (2006.01) | |
| B01D 53/86 | (2006.01) | |
| B01J 20/28 | (2006.01) | |
| B01J 21/18 | (2006.01) | |
| B01J 35/00 | (2006.01) | |
| B01J 37/00 | (2006.01) | |
| B01J 37/02 | (2006.01) | |
| B01J 37/03 | (2006.01) | |
| B01J 37/06 | (2006.01) | |
| B01J 37/08 | (2006.01) | |
| B01J 37/34 | (2006.01) | |

(52) U.S. Cl.
CPC ....... *B01J 20/0225* (2013.01); *B01J 20/0248* (2013.01); *B01J 20/0285* (2013.01); *B01J 20/20* (2013.01); *B01J 20/28083* (2013.01); *B01J 20/3057* (2013.01); *B01J 20/3078* (2013.01); *B01J 20/3085* (2013.01); *B01J 20/3204* (2013.01); *B01J 20/3236* (2013.01); *B01J 21/18* (2013.01); *B01J 35/004* (2013.01); *B01J 35/10* (2013.01); *B01J 35/1061* (2013.01); *B01J 37/0018* (2013.01); *B01J 37/0217* (2013.01); *B01J 37/0228* (2013.01); *B01J 37/0236* (2013.01); *B01J 37/035* (2013.01); *B01J 37/06* (2013.01); *B01J 37/084* (2013.01); *B01J 37/343* (2013.01); *B01D 2253/102* (2013.01); *B01D 2255/20746* (2013.01); *B01D 2255/20753* (2013.01); *B01D 2255/802* (2013.01); *B01D 2257/708* (2013.01); *B01D 2259/804* (2013.01)

(58) Field of Classification Search
CPC .............. B01J 20/28083; B01J 20/3057; B01J 20/3078; B01J 20/3085; B01J 20/3204; B01J 20/3236; B01J 21/18; B01J 35/004; B01J 35/10; B01J 35/1061; B01J 37/018; B01J 37/0217; B01J 37/0228; B01J 37/0236; B01J 37/035; B01J 37/06; B01J 37/084; B01J 37/343; B01D 53/02; B01D 53/8668; B01D 2253/102; B01D 2255/20746; B01D 2255/20753; B01D 2255/802; B01D 2257/708; B01D 2259/804
USPC .................................... 502/216, 222
See application file for complete search history.

(56) References Cited

FOREIGN PATENT DOCUMENTS

| | | | | |
|---|---|---|---|---|
| CN | 104959152 A | | 10/2015 | |
| CN | 10 5470321 | * | 4/2016 | ........... H01L 31/032 |
| CN | 106076366 A | | 11/2016 | |
| JP | 2005053737 A | | 3/2005 | |

OTHER PUBLICATIONS

V. Schellenschlager, et al., "Raman spectroscopic studies on decomposition of spinel-type cobalt chromium indium sulfide solid solutions." Materials Research Bulletin 35, pp. 567-574. (Year: 2000).*
Konstantin G. Nikiforov, "Magnetically Ordered Multinary Semiconductors." Progress in Crystal Growth and Characterization of Materials, pp. 1-104. (Year: 1999).*

* cited by examiner

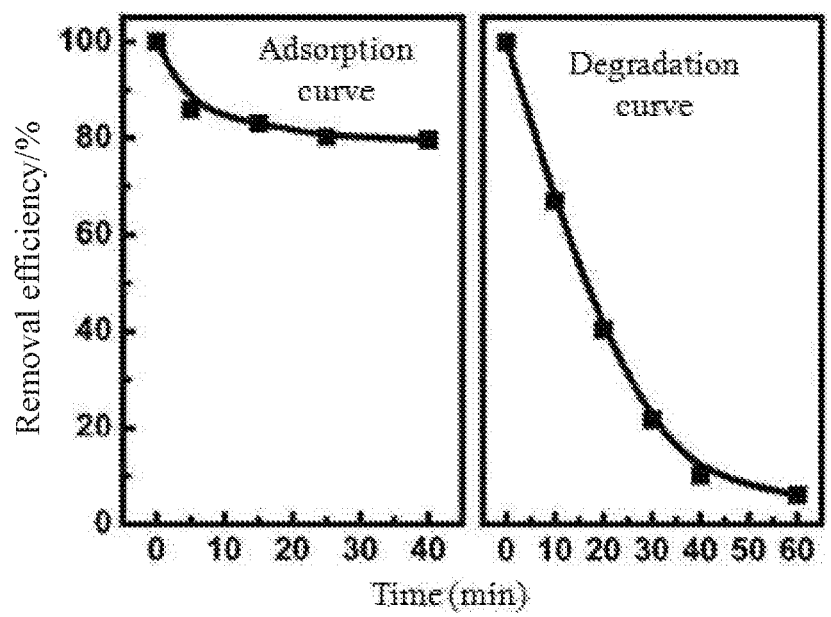

US 10,661,255 B2

SHORT CHANNEL ORDERED MESOPOROUS CARBON LOADED INDIUM COBALT SULFIDE AND INDIUM NICKEL SULFIDE TERNARY COMPOSITE PHOTOCATALYST, THE PREPARATION METHOD THEREOF AND THE USE THEREOF

CROSS-REFERENCE TO RELATED APPLICATIONS

This application is the U.S. National Phase of International Patent Application No. PCT/CN2017/084504, filed on 16 May 2017, which claims benefit of Chinese Patent Application No. 201610451136.3, filed on 20 Jun. 2016, the contents of which are incorporated herein by reference in their entirety.

TECHNICAL FIELD

The invention belongs to the technical field of adsorption type catalytic materials, and particularly relates to a short channel ordered mesoporous carbon loaded indium cobalt sulfide and indium nickel sulfide ternary composite photocatalyst, the preparation method thereof and the use therefor in the field of atmospheric environmental protection.

BACKGROUND

The pollution caused by volatile organic compounds (VOCs) is gradually destroying the living environment of human and endangering human health. How to effectively and economically eliminate the threat of VOCs to living environment of human and human health is a major problem to be solved. Photocatalytic oxidation technology has received extensive attention since it can lead to the final degradation of VOCs into $CO_2$ and $H_2O$ in the presence of light irradiation and catalysts. At present, most of the reported semiconductor photocatalysts exhibit activity only under the excitation of ultraviolet light, meaning that they can only use the ultraviolet part of sunlight (the ultraviolet light only accounts for about 5% of the total energy of sunlight), which greatly limits their practical application. To deal with this problem, a large number of researchers have begun to develop photocatalysts responsive to visible light, and have developed a large number of visible light active catalysts, but their catalytic efficiency is lower than that of ultraviolet light-responsive catalysts, which limits their practical application. Moreover, since the ultraviolet light in the sunlight causes severe photo-corrosion of the visible light-responsive catalyst, the visible light catalyst is unstable under the sunlight.

In order to better adsorb VOCs, ordered mesoporous materials are commonly used, which are a class of important materials with ordered channel structures obtained by self-assembly methods, such as ordered mesoporous carbon. Such materials have a large specific surface area and pore volume and a narrow pore size distribution which is uniformly adjustable in nanometer scale. They also have the characteristics of regular and controllable channel structure, easy surface modification and good thermal stability, etc. However, the conventional ordered mesoporous carbon is rod-shaped or fibrous with long channel and aggregated particles, which is not conducive to the diffusion and transport of VOCs in the channel. Then, how to effectively adsorb VOCs and improve their photocatalytic efficiency, prepare a stable and efficient solar photocatalyst under sunlight to enhance the adsorption and utilization of light by the catalyst, and further improve the stability of the catalyst is a technical problem that needs to be solved urgently.

At present, there is no research and report on the preparation of short channel ordered mesoporous carbon loaded indium cobalt sulfide and indium nickel sulfide ternary composite photocatalyst and its use in the degradation of volatile organic compounds.

SUMMARY OF THE INVENTION

In order to solve the above-mentioned deficiencies in the prior art, the primary object of the present invention is to provide a preparation method of a short channel ordered mesoporous carbon loaded indium cobalt sulfide and indium nickel sulfide ternary composite photocatalyst.

Another object of the present invention is to provide a short channel ordered mesoporous carbon loaded indium cobalt sulfide and indium nickel sulfide ternary composite photocatalyst prepared by the above method. The short channel ordered mesoporous carbon loaded indium cobalt sulfide and indium nickel sulfide ternary composite photocatalyst not only has strong adsorption performance on typical VOCs, but also has strong photocatalytic activity.

A further object of the invention is to provide a use of the short channel ordered mesoporous carbon loaded indium cobalt sulfide and indium nickel sulfide ternary composite photocatalyst.

The above objects of the invention are achieved by the following technical solutions:

A preparation method of a short channel ordered mesoporous carbon loaded indium cobalt sulfide and indium nickel sulfide ternary composite photocatalyst, comprising the following steps:

S1. adding 0.1-10 g surfactant to 10-120 mL water and concentrated hydrochloric acid solution with a volume ratio of 1-20:1 and stirring at 30-90° C. for 0.5-24 h to obtain a mixed solution A;

S2. adding 0.01-0.1 g ammonium fluoride to the mixed solution A obtained in step S1, stirring for 0.5-60 min, then adding 5-50 mL mixed solution of alkane and tetraethyl orthosilicate with a volume ratio of 1-10:1 and stirring at 30-90° C. for 2-72 h to obtain a mixed solution B;

S3. loading the mixed solution B obtained in step S2 into a 25-200 mL PTFE vessel to conduct a hydrothermal reaction at 60-250° C. for 2-72 h; after cooling in the PTFE vessel, collecting the lower layer sediment and calcining it at 300-800° C. for 1-2 h to obtain short channel ordered mesoporous silica;

S4. loading the short channel ordered mesoporous silica obtained in step S3, carbon source and water into a crucible at a mass ratio of 1:(10-30):(10-30), and at 50-100° C. for 1-24 h; then calcining them at 300-1000° C. for 1-24 h under the protection of nitrogen gas to obtain short channel ordered mesoporous carbon;

S5. mixing the short channel ordered mesoporous carbon obtained in step S4 with water, concentrated sulfuric acid and ammonium persulfate at a mass ratio of 1:(10-30):(2-10):(1-10) at 40-90° C. and stirring them for 1-24 h; collecting the sediments, washing them with water and drying them at 50-180° C. for 1-36 h to obtain pre-treated short channel ordered mesoporous carbon.

S6. adding 50-200 mg pre-treated short channel ordered mesoporous carbon obtained in step S5, 20-100 mg cobalt salt, 50-500 mg nickel salt, 60-300 mg indium salt and 30-300 mg reducing agent to a 30-100 mL alcohol solution sequentially; after ultrasonic dispersion for 10-60 min, loading the solution into a 50-200 mL PTFE vessel to conduct a hydrothermal reaction at 60-250° C. for 2-72 h; after cooling in the PTFE vessel, washing the precipitate with water and drying it at 40-80° C. for 3-12 h to obtain the short channel ordered mesoporous carbon loaded indium cobalt sulfide and indium nickel sulfide ternary composite photocatalyst.

Preferably, the surfactant in step S1 is a polyethylene oxide-polypropylene oxide-polyethylene oxide triblock copolymer, polyethylene glycol or cetyltrimethylammonium bromide.

Preferably, the alkane in step S2 is octane, decane or nonane.

Preferably, the carbon source in step S4 is phenol or sucrose.

Preferably, the cobalt salt in step S6 is cobalt chloride, cobalt nitrate or cobalt sulfate; the nickel salt is nickel chloride, nickel nitrate or nickel sulfate; the indium salt is indium chloride, indium nitrate or indium sulfate; and the reducing agent is thiourea, urea or thioacetamide.

Preferably, the alcohol solution in step S6 is ethanol or methanol dissolved in an organic solvent, and the organic solvent is glycerin or t-butanol.

Preferably, the volume ratio of the ethanol or methanol to the organic solvent is 1-10:1.

Preferably, the water in steps S1, S5 and S6 is deionized water.

Moreover, a short channel ordered mesoporous carbon loaded indium cobalt sulfide and indium nickel sulfide ternary composite photocatalyst prepared by the above preparation methods and use of the short channel ordered mesoporous carbon loaded indium cobalt sulfide and indium nickel sulfide ternary composite photocatalyst in the field of environmental protection as a selective adsorbent or a photocatalyst are included in the protection scope of the present invention.

Preferably, the short channel ordered mesoporous carbon loaded indium cobalt sulfide and indium nickel sulfide ternary composite photocatalyst specifically exhibits better adsorption and photocatalysis performance toward xylene.

The present invention provides a preparation method for a short channel ordered mesoporous carbon loaded indium cobalt sulfide and indium nickel sulfide ternary composite photocatalyst, comprising the following steps:

S1. mixing surfactant, water and concentrated hydrochloric acid to obtain a mixed solution A;

S2. mixing ammonium fluoride, the mixed solution A, alkane and tetraethyl orthosilicate to obtain a mixed solution B;

S3. placing the mixed solution B in a PTFE vessel for hydrothermal reaction, and after cooling, collecting the precipitate and calcining it to obtain short channel ordered mesoporous silica;

S4. mixing the short channel ordered mesoporous silica, a carbon source and water for reaction, and calcining the obtained product to obtain short channel ordered mesoporous carbon;

S5. mixing the short channel ordered mesoporous carbon, water, concentrated sulfuric acid and ammonium persulfate, collecting the precipitate and washing it by water to obtain pre-treated short channel ordered mesoporous carbon;

S6. mixing the pre-treated short channel ordered mesoporous carbon, cobalt salt, nickel salt, indium salt, reducing agent with alcohol solution, and then placing the solution in a PTFE vessel for hydrothermal reaction to obtain the short channel ordered mesoporous carbon loaded indium cobalt sulfide and indium nickel sulfide ternary composite photocatalyst.

Preferably, in step S1, the ratio of the solution obtained from the water and the concentrated hydrochloric acid to the surfactant is (10-120) mL:(0.1-10) g, and the volume ratio of the water to the concentrated hydrochloric acid is (1-20): 1.

Preferably, in step S1, the mixing is carried out by stirring, and the stirring is performed at a temperature of 30-90° C. for 0.5-24 h.

Preferably, in step S2, the process of obtaining the mixed solution B is specifically:

mixing the ammonium fluoride with the mixed solution A; after stirring, adding a mixed solution of the alkane and the tetraethyl orthosilicate, and stirring again to obtain the mixed solution B.

Preferably, the ratio of the ammonium fluoride to the mixed solution is (0.01-0.1) g:(5-50) mL; the volume ratio of the alkane and the tetraethyl orthosilicate is (1-10): 1; the time of the said stirring is 0.5-60 min, and the said stirring again is conducted at a temperature of 30-90° C. for 2-72 h.

Preferably, in step S3, the hydrothermal reaction is conducted at a temperature of 60-250° C. for 2-72 h; and the calcination is conducted under protective atmosphere at 300-800° C. for 1-2 h.

Preferably, in step S4, the mass ratio of the short channel ordered mesoporous carbon, the carbon source and the water is 1:(10-30):(10-30); the reaction is conducted at a temperature of 50-100° C. for 1-24 h; the calcination is carried out under a protective atmosphere at a temperature of 300-1000° C. for 1-24 h.

Preferably, in step S5, the mass ratio of the short channel ordered mesoporous carbon, the water, the concentrated sulfuric acid and the ammonium persulfate is 1:(10-30):(2-10):(1-10); the mixing is carried out by stirring, and the stirring is conducted at a temperature of 40-90° C. for 1-24 h; and the drying is conducted at a temperature of 50-180° C. for 1-36 h.

Preferably, in step S6, the ratio of the pretreated short channel ordered mesoporous carbon, the cobalt salt, the nickel salt, the indium salt, the reducing agent and the alcohol solution is (50-200) mg:(20-100) mg:(50-500) mg:(60-300) mg:(30-300) mg:(30-100) mL.

Preferably, in step S6, the time of the said mixing is 10-60 min, and the hydrothermal reaction is conducted at a temperature of 60-250° C. for 2-72 h.

Preferably, the surfactant in step S1 is a polyethylene oxide-polypropylene oxide-polyethylene oxide triblock copolymer, polyethylene glycol or cetyltrimethylammonium bromide.

Preferably, the alkane in step S2 is octane, decane or nonane.

Preferably, the carbon source in step S4 is phenol or sucrose.

Preferably, the cobalt salt is cobalt chloride, cobalt nitrate or cobalt sulfate; the nickel salt is nickel chloride, nickel nitrate or nickel sulfate; the indium salt is indium chloride, indium nitrate or indium sulfate; and the reducing agent is thiourea, urea or thioacetamide.

Preferably, the alcohol solution in step S6 is ethanol or methanol dissolved in an organic solvent, and the organic solvent is glycerin or t-butanol.

Preferably, the volume ratio of the ethanol or methanol to the organic solvent is 1-10:1.

Preferably, the water in steps S1, S5 and S6 is deionized water.

The present invention also provides a short channel ordered mesoporous carbon loaded indium cobalt sulfide and indium nickel sulfide ternary composite photocatalyst prepared by the above preparation methods.

The present invention further provides use of the short channel ordered mesoporous carbon loaded indium cobalt sulfide and indium nickel sulfide ternary composite photocatalyst in the field of environmental protection. In the invention, a novel high-efficiency adsorption-photocatalytic composite material is prepared by combining indium cobalt sulfide and indium nickel sulfide as catalysts with ordered mesoporous carbon materials. Under the sunlight, it can effectively adsorb VOCs, enhance the absorption and utilization of light by the catalyst, and further improve the stability of the catalyst. This is because the indium cobalt sulfide and the indium nickel sulfide have narrow band gap energy, so that they can effectively absorb visible light and generate photogenerated electron-hole pairs, wherein the photogenerated electrons have a reduction effect on the indium cobalt sulfide and the indium nickel sulfide to generate photocorrosion phenomenon. However, since indium cobalt sulfide and indium nickel sulfide have different conduction band and valence band positions, the mutual contact between them facilitates the transmission of photogenerated electrons, thereby separating photogenerated electrons and holes, effectively suppressing the reduction effect of photogenerated electrons on indium cobalt sulfide and indium nickel sulfide, improving their photocorrosion resistance and thus the stability of the catalyst.

In the present invention, the short channel ordered mesoporous carbon material is used as an adsorbent for VOCs. Because of its short channel, compared to the conventional rod-shaped or fibrous ordered mesoporous carbon, it is more prone to mass transfer and diffusion of VOCs in the pores. The VOCs can rapidly diffuse on the surface of the indium cobalt sulfide and indium nickel sulfide catalysts, rapidly reach the active sites of the catalyst so that the adsorption of VOCs can be improved. At the same time, the short channel ordered mesoporous carbon can increase the transmission rate of photogenerated electrons, and the photogenerated electrons can be transferred from the indium cobalt sulfide and the indium nickel sulfide to the mesoporous carbon, which can further inhibit the photocorrosion of indium cobalt sulfide and the indium nickel sulfide and improve the stability and photocatalytic performance of the catalyst. Therefore, the short channel ordered mesoporous carbon loaded indium cobalt sulfide and indium nickel sulfide ternary composite photocatalyst can not only improve the adsorption and enrichment of VOCs by indium cobalt sulfide and indium nickel sulfide, but also further improve the sunlight stability and photocatalytic properties of the catalyst, thus achieving the integration of adsorption and photocatalytic oxidation of VOCs.

Compared with the prior art, the present invention has the following beneficial effects:

The invention combines the adsorption and enrichment functions of short channel ordered mesoporous carbon on VOCs and the photocatalytic degradation function of indium zinc sulfide photocatalyst to prepare a novel high-efficiency adsorption-photocatalytic integrated material-a short channel ordered mesoporous carbon loaded indium cobalt sulfide and indium nickel sulfide ternary composite photocatalyst. Compared to binary composite photocatalyst, it has higher light utilization efficiency, electron transport performance and light stability.

The short channel ordered mesoporous carbon loaded indium cobalt sulfide and indium nickel sulfide ternary composite photocatalyst prepared by the invention exhibits good adsorption and photocatalytic activity for typical VOCs, gaseous xylene, wherein the adsorption rate of xylene reaches 20.3% within 40 min, and the degradation rate of gaseous xylene is as high as 93.9% within 60 min, which can realize integration of adsorption and photocatalytic oxidation of typical VOCs, gaseous xylene. Also, the hydroxyl radical generated on the catalyst surface can effectively in situ degrade the adsorbed and enriched VOCs, the reaction rate and efficiency of photocatalytic degradation of organic pollutants can be greatly enhanced, the problem of regeneration of adsorbents in situ can be solved, and the problem of post-treatment and secondary pollution of adsorbents can be avoided.

BRIEF DESCRIPTION OF THE DRAWINGS

FIG. 1 shows the adsorption kinetics and photocatalytic degradation kinetics curves of gaseous xylene by the short channel ordered mesoporous carbon loaded indium cobalt sulfide and indium nickel sulfide ternary composite photocatalyst.

DETAILED DESCRIPTION OF THE EMBODIMENTS

The content of the present invention is further described below with reference to the accompanying drawings and specific embodiments, but is not to be construed as limiting. The technical means used in the examples are conventional means well known to those skilled in the art unless otherwise specified. Unless otherwise stated, the reagents, methods and devices employed in the present invention are routine reagents, methods and devices in the art.

Example 1

1. Preparation:

S1. adding 0.1 g polyethylene oxide-polypropylene oxide-polyethylene oxide triblock copolymer to 10 mL of water and concentrated hydrochloric acid solution with a volume ratio of 20:1, and stirring at 90° C. for 0.5 h to obtain a clear solution;

S2. adding 0.01 g ammonium fluoride to the clear solution obtained in step S1, stirring for 0.5 min, then adding 5 mL mixture of octane and tetraethyl orthosilicate with a volume ratio of 1:1 and stirring at 30° C. for 2 h to obtain a white turbid solution;

S3. loading the white turbid solution obtained in step S2 into a 25 mL PTFE vessel, carrying out a hydrothermal reaction at 60° C. for 72 h; after cooling in the PTFE vessel, collecting the lower layer precipitate and calcining it at 300° C. for 24 h to obtain short channel ordered mesoporous silica;

S4. loading the short channel ordered mesoporous silica obtained in step S3, phenol and water into a crucible at a mass ratio of 1:10:10; after reacting at 50° C. for 1 h, calcining them at 300° C. for 24 h under nitrogen protective atmosphere to obtain short channel ordered mesoporous carbon;

S5. stirring the short channel ordered mesoporous carbon obtained in step S4 with water, concentrated sulfuric acid and ammonium persulfate at a mass ratio of 1:10:10:10 at 40° C. for 24 h; then collecting the precipitate, washing it and drying it at 50° C. for 36 h to obtain pretreated short channel ordered mesoporous carbon;

S6. slowly adding 50 mg pretreated short channel ordered mesoporous carbon obtained in step S5, 20 mg cobalt chloride, 50 mg nickel chloride, 60 mg indium chloride and 30 mg thiourea sequentially to 30 mL alcohol solution (ethanol and glycerol with a volume ratio of 1:1); after ultrasonic dispersion for 10 min, placing them in a 50 mL PTFE vessel and carrying out a hydrothermal reaction at 60° C. for 72 h; after cooling in the PTFE, vessel, washing the precipitate with water and drying it at 40° C. for 12 h to obtain a short channel ordered mesoporous carbon loaded indium cobalt sulfide and indium nickel sulfide ternary composite photocatalyst.

2. Performance Test:

FIG. 1 shows the adsorption kinetics and photocatalytic degradation kinetics curves of gaseous xylene by the short channel ordered mesoporous carbon loaded indium cobalt sulfide and indium nickel sulfide ternary composite photocatalyst. It can be seen from FIG. 1 that the photocatalyst exhibits good adsorption and photocatalytic activity, wherein the adsorption efficiency of xylene reaches 20.3% within 40 min, and the degradation efficiency of xylene reaches 93.9% within 60 min. The results show that the short channel ordered mesoporous carbon loaded indium cobalt sulfide and indium nickel sulfide ternary composite photocatalyst prepared by the invention is a novel material with high adsorption and photocatalytic activity.

Example 2

S1. adding 10 g polyethylene glycol to 120 mL of water and concentrated hydrochloric acid solution with a volume ratio of 1:1, and stirring at 30° C. for 24 h to obtain a clear solution;

S2. adding 0.01 g ammonium fluoride to the clear solution obtained in step S1, stirring for 60 min, then adding 5 mL mixture of decane and tetraethyl orthosilicate with a volume ratio of 10:1 and stirring at 30° C. for 2 h to obtain a white turbid solution;

S3. loading the white turbid solution obtained in step S2 into a 200 mL PTFE vessel, carrying out a hydrothermal reaction at 250° C. for 2 h; after cooling in the PTFE vessel, collecting the lower layer precipitate and calcining it at 800° C. for 1 h to obtain short channel ordered mesoporous silica;

S4. loading the short channel ordered mesoporous silica obtained in step S3, sucrose and water into a crucible at a mass ratio of 1:30:30; after reacting at 100° C. for 24 h, calcining them at 1000° C. for 1 h under nitrogen protective atmosphere to obtain short channel ordered mesoporous carbon;

S5. stirring the short channel ordered mesoporous carbon obtained in step S4 with water, concentrated sulfuric acid and ammonium persulfate at a mass ratio of 1:30:2:1 at 90° C. for 1 h; then collecting the precipitate, washing it and drying it at 180° C. for 1 h to obtain pretreated short channel ordered mesoporous carbon;

S6. slowly adding 200 mg pretreated short channel ordered mesoporous carbon obtained in step S5, 100 mg cobalt chloride, 500 mg nickel chloride, 300 mg indium chloride and 300 mg urea sequentially to 100 mL alcohol solution (methanol and tert-butanol with a volume ratio of 10:1); after ultrasonic dispersion for 60 min, placing them in a 200 mL PTFE vessel and carrying out a hydrothermal reaction at 250° C. for 2 h; after cooling in the PTFE vessel, washing the precipitate with water and drying it at 80° C. for 3 h to obtain a short channel ordered mesoporous carbon loaded indium cobalt sulfide and indium nickel sulfide ternary composite photocatalyst.

Example 3

S1. adding 2 g cetyltrimethylammonium bromide to 50 mL of water and concentrated hydrochloric acid solution with a volume ratio of 5:1, and stirring at 45° C. for 4 h to obtain a clear solution;

S2. adding 0.05 g ammonium fluoride to the clear solution obtained in step S1, stirring for 30 min, then adding 10 mL mixture of nonane and tetraethyl orthosilicate with a volume ratio of 4:1 and stirring at 4° C. for 12 h to obtain a white turbid solution;

S3. loading the white turbid solution obtained in step S2 into a 100 mL PTFE vessel, carrying out a hydrothermal reaction at 100° C. for 48 h; after cooling in the PTFE vessel, collecting the lower layer precipitate and calcining it at 540° C. for 5 h to obtain short channel ordered mesoporous silica;

S4. loading the short channel ordered mesoporous silica obtained in step S3, sucrose and water into a crucible at a mass ratio of 1:20:20; after reacting at 45° C. for 12 h, calcining them at 900° C. for 4 h under nitrogen protective atmosphere to obtain short channel ordered mesoporous carbon;

S5. stirring the short channel ordered mesoporous carbon obtained in step S4 with water, concentrated sulfuric acid and ammonium persulfate at a mass ratio of 1:15:5:5 at 50° C. for 8 h; then collecting the precipitate, washing it and drying it at 100° C. for 12 h to obtain pretreated short channel ordered mesoporous carbon;

S6. slowly adding 100 mg pretreated short channel ordered mesoporous carbon obtained in step S5, 50 mg cobalt chloride, 200 mg nickel chloride, 250 mg indium chloride and 250 mg urea sequentially to 40 mL alcohol solution (ethanol and tert-butanol with a volume ratio of 5:1); after ultrasonic dispersion for 20 min, placing them in a 100 mL PTFE vessel and carrying out a hydrothermal reaction at 150° C. for 9 h; after cooling in the PTFE vessel, washing the precipitate with water and drying it at 60° C. for 8 h to obtain a short channel ordered mesoporous carbon loaded indium cobalt sulfide and indium nickel sulfide ternary composite photocatalyst.

Example 4

S1. adding 6 g polyethylene oxide-polypropylene oxide-polyethylene oxide triblock copolymer to 85 mL of water and concentrated hydrochloric acid solution with a volume ratio of 8:1, and stirring at 35° C. for 3 h to obtain a clear solution;

S2. adding 0.02 g ammonium fluoride to the clear solution obtained in step S1, stirring for 10 min, then adding 25 mL mixture of decane and tetraethyl orthosilicate with a volume ratio of 6:1 and stirring at 35° C. for 24 h to obtain a white turbid solution;

S3. loading the white turbid solution obtained in step S2 into a 150 mL PTFE vessel, carrying out a hydrothermal reaction at 90° C. for 24 h; after cooling in the PTFE vessel, collecting the lower layer precipitate and calcining it at 600° C. for 6 h to obtain short channel ordered mesoporous silica;

S4. loading the short channel ordered mesoporous silica obtained in step S3, phenol and water into a crucible at a mass ratio of 1:15:15; after reacting at 45° C. for 12 h, calcining them at 850° C. for 10 h under nitrogen protective atmosphere to obtain short channel ordered mesoporous carbon;

S5. stirring the short channel ordered mesoporous carbon obtained in step S4 with water, concentrated sulfuric acid and ammonium persulfate at a mass ratio of 1:12:4:2 at 60° C. for 4 h; then collecting the precipitate, washing it and drying it at 100° C. for 6 h to obtain pretreated short channel ordered mesoporous carbon;

S6. slowly adding 150 mg pretreated short channel ordered mesoporous carbon obtained in step S5, 80 mg cobalt chloride, 145 mg nickel chloride, 145 mg indium chloride and 155 mg urea sequentially to 45 mL alcohol solution (methanol and glycerin with a volume ratio of 3:1); after ultrasonic dispersion for 15 min, placing them in a 100 mL PTFE vessel and carrying out a hydrothermal reaction at 180° C. for 10 h; after cooling in the PTFE vessel, washing the precipitate with water and drying it at 50° C. for 12 h to obtain a short channel ordered mesoporous carbon loaded indium cobalt sulfide and indium nickel sulfide ternary composite photocatalyst.

The above-described embodiments are preferred embodiments of the present invention, but the embodiments of the present invention are not limited to the above-described embodiments, and any other changes, modifications, substitutions, combinations, modifications and simplifications made without departing from the spirit and scope of the invention should be equivalent replacements and be included in the scope of the present invention

What is claimed is:

1. A preparation method of a short channel ordered mesoporous carbon loaded indium cobalt sulfide and indium nickel sulfide ternary composite photocatalyst, wherein the preparation method comprises the following steps:
   S1. adding 0.1-10 g surfactant to 10-120 mL water and concentrated hydrochloric acid solution with a volume ratio of 1-20:1 and stirring at 30-90° C. for 0.5-24 h to obtain a mixed solution A;
   S2. adding 0.01-0.1 g ammonium fluoride to the mixed solution A obtained in step S1, stirring for 0.5-60 min, then adding 5-50 mL mixed solution of alkane and tetraethyl orthosilicate with a volume ratio of 1-10:1 and stirring at 30-90° C. for 2-72 h to obtain a mixed solution B;
   S3. loading the mixed solution B obtained in step S2 into a 25-200 mL polytetrafluoroethylene (PTFE) vessel to conduct a hydrothermal reaction at 60-250° C. for 2-72 h; after cooling in the PTFE vessel, collecting the lower layer sediment and calcining it at 300-800° C. for 1-2 h to obtain short channel ordered mesoporous silica;
   S4. loading the short channel ordered mesoporous silica obtained in step S3, carbon source and water into a crucible with a mass ratio of 1:(10-30):(10-30), and reacting at 50-100° C. for 1-24 h; then calcining them at 300-1000° C. for 1-24 h under the protection of nitrogen gas to obtain short channel ordered mesoporous carbon;
   S5. mixing the short channel ordered mesoporous carbon obtained in step S4 with water, concentrated sulfuric acid and ammonium persulfate at a mass ratio of 1:(10-30):(2-10):(1-10) at 40-90° C. and stirring them for 1-24 h; collecting the sediments, washing them with water and drying them at 50-180° C. for 1-36 h to obtain pre-treated short channel ordered mesoporous carbon;
   S6. adding 50-200 mg pre-treated short channel ordered mesoporous carbon obtained in step S5, 20-100 mg cobalt salt, 50-500 mg nickel salt, 60-300 mg indium salt and 30-300 mg reducing agent to a 30-100 mL alcohol solution sequentially; after ultrasonic dispersion for 10-60 min, loading the solution into a 50-200 mL PTFE vessel to carry out a hydrothermal reaction at 60-250° C. for 2-72 h; after cooling in the PTFE vessel, washing the precipitate with water and drying it at 40-80° C. for 3-12 h to obtain the short channel ordered mesoporous carbon loaded indium cobalt sulfide and indium nickel sulfide ternary composite photocatalyst.

2. The preparation method according to claim 1, wherein the surfactant in step S1 is a polyethylene oxide-polypropylene oxide-polyethylene oxide triblock copolymer, polyethylene glycol or cetyltrimethylammonium bromide.

3. The preparation method according to claim 1, wherein the alkane in step S2 is octane, decane or nonane.

4. The preparation method according to claim 1, wherein the carbon source in step S4 is phenol or sucrose.

5. The preparation method according to claim 1, wherein the cobalt salt in step S6 is cobalt chloride, cobalt nitrate or cobalt sulfate; the nickel salt is nickel chloride, nickel nitrate or nickel sulfate; the indium salt is indium chloride, indium nitrate or indium sulfate; and the reducing agent is thiourea, urea or thioacetamide.

6. The preparation method according to claim 1, wherein the alcohol solution in step S6 is ethanol or methanol dissolved in an organic solvent, and the organic solvent is glycerin or t-butanol.

7. The preparation method according to claim 6, wherein the volume ratio of the ethanol or methanol to the organic solvent is 1-10:1.

8. The preparation method according to claim 1, wherein the water in steps S1, S5 and S6 is deionized water.

9. A short channel ordered mesoporous carbon loaded indium cobalt sulfide and indium nickel sulfide ternary composite photocatalyst prepared by the preparation method according to claim 1.

10. A preparation method for a short channel ordered mesoporous carbon loaded indium cobalt sulfide and indium nickel sulfide ternary composite photocatalyst, wherein the preparation method comprises the following steps:
    S1. mixing surfactant, water and concentrated hydrochloric acid to obtain a mixed solution A;
    S2. mixing ammonium fluoride, the mixed solution A, alkane and tetraethyl orthosilicate to obtain a mixed solution B;
    S3. placing the mixed solution B in a PTFE vessel for hydrothermal reaction, and after cooling, collecting the precipitate and calcining it to obtain short channel ordered mesoporous silica;
    S4. mixing the short channel ordered mesoporous silica, a carbon source and water for reaction, and calcining the obtained product to obtain short channel ordered mesoporous carbon;
    S5. mixing the short channel ordered mesoporous carbon, water, concentrated sulfuric acid and ammonium persulfate, collecting the precipitate and washing it by water to obtain pre-treated short channel ordered mesoporous carbon;
    S6. mixing the pre-treated short channel ordered mesoporous carbon, cobalt salt, nickel salt, indium salt, reducing agent with alcohol solution, and then placing the solution in a PTFE vessel for hydrothermal reaction to obtain the short channel ordered mesoporous carbon loaded indium cobalt sulfide and indium nickel sulfide ternary composite photocatalyst.

11. The preparation method according to claim 10, wherein in step S1, the ratio of the solution obtained from the water and the concentrated hydrochloric acid to the surfactant is (10-120) mL:(0.1-10) g, and the volume ratio of the water to the concentrated hydrochloric acid is (1-20): 1.

12. The preparation method according to claim 10, wherein in step S1, the mixing is carried out by stirring, and the stirring is performed at a temperature of 30-90° C. for 0.5-24 h.

13. The preparation method according to claim 10, wherein in step S2, the process of obtaining the mixed solution B is specifically:

mixing the ammonium fluoride with the mixed solution A; after stirring, adding a mixed solution of the alkane and the tetraethyl orthosilicate, and stirring again to obtain the mixed solution B.

14. The preparation method according to claim 13, wherein the ratio of the ammonium fluoride to the mixed solution is (0.01-0.1) g:(5-50) mL; the volume ratio of the alkane and the tetraethyl orthosilicate is (1-10):1; the time of the said stirring is 0.5-60 min, and the said stirring again is conducted at a temperature of 30-90° C. for 2-72 h.

15. The preparation method according to claim 10, wherein in step S3, the hydrothermal reaction is conducted at a temperature of 60-250° C. for 2-72 h; and the calcination is conducted under protective atmosphere at 300-800° C. for 1-2 h.

16. The preparation method according to claim 10, wherein in step S4, the mass ratio of the short channel ordered mesoporous carbon, the carbon source and the water is 1:(10-30):(10-30); the reaction is conducted at a temperature of 50-100° C. for 1-24 h; the calcination is carried out under a protective atmosphere at a temperature of 300-1000° C. for 1-24 h.

17. The preparation method according to claim 10, wherein in step S5, the mass ratio of the short channel ordered mesoporous carbon, the water, the concentrated sulfuric acid and the ammonium persulfate is 1:(10-30):(2-10):(1-10); the mixing is carried out by stirring, and the stirring is conducted at a temperature of 40-90° C. for 1-24 h; and
the drying is conducted at a temperature of 50-180° C. for 1-36 h.

18. The preparation method according to claim 10, wherein in step S6, the ratio of the pretreated short channel ordered mesoporous carbon, the cobalt salt, the nickel salt, the indium salt, the reducing agent and the alcohol solution is (50-200) mg:(20-100) mg:(50-500) mg:(60-300) mg:(30-300) mg:(30-100) mL.

19. The preparation method according to claim 10, wherein in step S6, the time of the mixing is 10-60 min, and the hydrothermal reaction is conducted at a temperature of 60-250° C. for 2-72 h.

20. The preparation method according to claim 10, wherein the surfactant in step S1 is a polyethylene oxide-polypropylene oxide-polyethylene oxide triblock copolymer, polyethylene glycol or cetyltrimethylammonium bromide.

21. The preparation method according to claim 10, wherein the alkane in step S2 is octane, decane or nonane.

22. The preparation method according to claim 10, wherein the carbon source in step S4 is phenol or sucrose.

23. The preparation method according to claim 10, wherein the cobalt salt is cobalt chloride, cobalt nitrate or cobalt sulfate; the nickel salt is nickel chloride, nickel nitrate or nickel sulfate; the indium salt is indium chloride, indium nitrate or indium sulfate; and the reducing agent is thiourea, urea or thioacetamide.

24. The preparation method according to claim 10, wherein the alcohol solution in step S6 is ethanol or methanol dissolved in an organic solvent, and the organic solvent is glycerin or t-butanol.

25. The preparation method according to claim 24, wherein the volume ratio of the ethanol or methanol to the organic solvent is 1-10:1.

26. The preparation method according to claim 10, wherein the water in steps S1, S5 and S6 is deionized water.

27. A short channel ordered mesoporous carbon loaded indium cobalt sulfide and indium nickel sulfide ternary composite photocatalyst prepared by the preparation method according to claim 10.

\* \* \* \* \*

UNITED STATES PATENT AND TRADEMARK OFFICE
CERTIFICATE OF CORRECTION

PATENT NO. : 10,661,255 B2
APPLICATION NO. : 16/099554
DATED : May 26, 2020
INVENTOR(S) : Taicheng An et al.

It is certified that error appears in the above-identified patent and that said Letters Patent is hereby corrected as shown below:

On the Title Page

Item (72), Inventors:
Now reads "Taicheng An, Guangdong (CN);
Jiangyao Chen, Guangdong (CN);
Guiying Li, Guangdong (CN);
Hongli Liu, Guangdong (CN)"

Should read --Taicheng An, Guangdong (CN);
Jiangyao Chen, Guangdong (CN);
Hongli Liu, Guangdong (CN);
Guiying Li, Guangdong (CN)--

Signed and Sealed this
Eighth Day of September, 2020

Andrei Iancu
*Director of the United States Patent and Trademark Office*